Patented Sept. 11, 1951

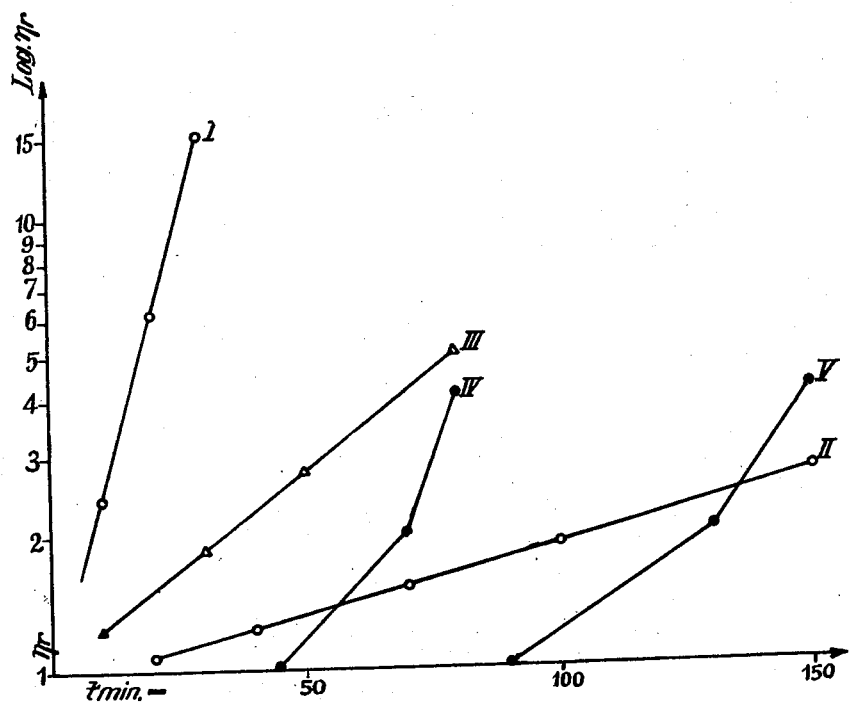

2,567,803

UNITED STATES PATENT OFFICE 2,567,803

BULK POLYMERIZATION OF VINYL COMPOUNDS USING A SULFINIC ACID CATALYST

Pierre Castan and Oskar Hagger, Zurich, Switzerland, assignors to Gebr. de Trey Aktiengesellschaft, Zurich, Switzerland Application February 4, 1948, Serial No. 6,268
In Switzerland February 7, 1947

8 Claims. (Cl. 260—80)

This invention has reference to the catalytic polymerisation of a liquid monomer which contains a terminal vinylidene group ($CH_2:C=$) at normal or, at the most, only slightly raised temperatures.

It is well known to polymerise vinyl-compounds in aqueous emulsions in the presence of bisulphite acting as a catalyser. However, due to the fact that bisulphite in general is insoluble or but slightly soluble in organic solvents and especially not in the monomeric vinyl-starting materials, it can not be used for the so called bulk-polymerisation of vinyl-compounds.

It has now surprisingly been found that the organic derivatives of sulphurous-acid such as the so called sulphinic-acids, especially these of the aromatic series, are excellent catalysers for the polymerisation of vinyl-compounds which, due to their solubility in the monomeric starting materials, are also well suited for use in bulk-polymerisation.

It will be appreciated that the field of application is not limited to bulk-polymerisation only, but the sulphinic acids may also be used in the polymerisation of monomeric vinyl compounds which are mixed with already prepared pulverised polymerides or also in emulsion-polymerisation. The polymerisation reaction starts at room temperature without initial heating.

Examples of vinyl-derivatives which can be polymerised according to the process of the invention, include methacrylic acid, acrylic acid esters and methacrylic acid esters, methacrylic acid anhydride, $\alpha$-halogen acrylates, styrol, and enamines e. g. vinyl carbazol. The starting material is selected in accordance with the desired character of the end-product.

Suitable sulphinic-acid catalysers appropriately are used in an amount of about 0.1% to 5% by weight of the monomeric starting material, and include for example o- and p-toluene sulphinic acid, chlorbenzene sulphinic acid, 2-naphthalene sulphinic acid, xylene sulphinic acid, p-cymol sulphinic acid as well as many other sulphinic acids of the aromatic series, especially those containing at least two benzene nuclei i. e. sulphinic acids of the naphthalene and anthracene series.

Due to its stability, the 2-naphthalene sulphinic acid is especially adapted to be used and marketed in admixture with powdered polymerides which have been previously prepared, and which then only have to be mixed with monomeric vinyl-derivatives to produce said polymerised blocks. This modification is especially adapted for dental work wherein the polymerisation is effected in the mouth of the patient, e. g. when making crowns or fillings of teeth or when fixing prosthetical works, as crowns, bridges, etc.

We have found that the known catalysers such as ortho- or para-chlorbenzoyl peroxide, polymerise methyl methacrylate also at 37° C, but we have stated that, even when using freshly distilled monomeric substance, there is a certain period of induction until polymerisation starts, whereas, when using methylmethacrylic acid ester which has been stabilized with hydroquinone, the hardening could no longer be performed within a short enough time.

The products polymerised with sulphinic acids are distinguished from the ethenes polymerised with tertiary aminoxides by the fact that they remain colourless.

In the annexed graph, the results of some comparative tests with sulphinic acids and peroxide catalysts are shown. The rate of polymerisation is plotted as a function of the time by the relative viscosity log $\eta$ r. The curves I—V refer to the following compounds:

I. 0.4% toluene sulphinic acid in stabilised methylmethacrylate at 37° C.

II. 0.8% toluene sulphinic acid in styrol at 37° C.

III. 0.4% toluene sulphinic acid in styrol at 70° C.

IV. 1.8% benzoylperoxide in stabilised methylmethacrylate at 60° C.

V. 3% o-chlorobenzoyl peroxide in pure methylmethacrylate at 37° C.

The curves I, II and III, on extrapolation back to their origin, show that, when using sulphinic acid catalysts, polymerisation starts immediately even when using stabilised monomeric compounds and at room temperature whereas, when using peroxide catalysts as shown by the curves IV and V, there is a long period of induction which for certain fields of application is undesirable.

Further tests have shown that e. g. methacrylic acid monoglycolic ester polymerises at 0° C. when using sulphinic acid catalysts, and that, when using 0.4% toluene sulphinic acid, the hardening of the block is performed in 10 seconds.

The polymerisation process according to the invention is also of advantage for the preparation of technical articles, where working at room temperatures is desirable, e. g. in the casting of electrical insulators in electrical apparatus, in the manufacture of optical devices and lenses or of printing-blocks from polymerised methyl methacrylate, in the process of cold hardening lacquers and varnishes, of impregnating and hardening wood, and in the manufacture of pressed radio technical articles or of adhesives for the manufacture of shoes, etc. When finishing textiles or manufacturing artificial leather, the invention makes it possible to work on unheated calenders or spreader tables without the use of exhausters.

In the following examples the invention will be explained in a more detailed manner.

*Example I*

About 1% by weight of o-chlorobenzene sulphinic acid is dissolved in monomeric methylmethacrylate. The solution gradually turns more viscous at room temperature, and is adapted to be used as a clear transparent varnish which hardens quickly at room temperatures.

*Example II*

About 2% by weight of 2-naphthalene sulphinic acid is mixed with powdered polymerised methylmethacrylate. The polymer may have been produced in a convenient manner by using as catalyst a sulphinic acid or a peroxide or bisulphite. When the said mixture is impregnated with monomeric methylmethacrylate, a pasty mass is obtained which is especially suitable for use in dental works, and which, when for example pressed into the cavity of a tooth, hardens in the mouth to form a filling.

This pasty mass may also be filled in moulds and slightly pressed so as to polymerise into a transparent moulded article. Such a process is especially suitable for the manufacture of dental prostheses by the aid of plaster-moulds.

Jacket-crowns may be prepared by filling said mass into Celluloid crown-forms, and pressing said forms on the tooth-stump suitably prepared with retentions, whereupon polymerisation is effected in the mouth.

We claim:

1. In a process for the catalytic preparation of a bulk polymerized liquid monomer containing a terminal $CH_2:C=$ group, the step of performing the polymerization in the presence of a sulfinic acid of the aromatic series in an amount between the limits of about 0.1% and about 5.0% taken on the weight of the liquid monomer, said sulfinic acid being the sole catalytic agent.

2. In a process for the catalytic preparation of a bulk polymerized liquid monomer containing a terminal $CH_2:C=$ group, the step of mixing a liquid monomer containing a terminal $CH_2:C=$ group with a sulfinic acid of the aromatic series containing at least two combined benzene nuclei in an amount between the limits of about 0.1% and about 5.0% taken on the weight of the liquid monomer, and performing the polymerization at a temperature not exceeding 37° C., said sulfinic acid being the sole catalytic agent.

3. In a process for the catalytic preparation of a bulk polymerized liquid monomer containing a terminal $CH_2:C=$ group, the steps of mixing a liquid monomer containing a terminal $CH_2:C=$ group with a sulfinic acid of the aromatic series in an amount between the limits of about 0.1% and about 5.0% taken on the weight of the liquid monomer, applying the mixture when it reaches the appropriate consistency on a surface, and finishing the polymerization at room temperature, said sulfinic acid being the sole added catalytic agent.

4. The process comprising mixing a previously prepared polymeride of a liquid monomer containing a terminal $CH_2:C=$ group with a sulfinic acid of the aromatic series, introducing into the resulting mixture a liquid monomer containing a terminal $CH_2:C=$ group until the mass assumes a pasty state, and molding and polymerizing the so-treated mass in the presence of said sulfinic acid as the sole catalytic agent, the latter being present in the mass being polymerized in an amount between the limits of about 0.1% and about 5.0% taken on the weight of said introduced liquid monomer.

5. The process as defined in claim 4 in which the polymerization is effected at a temperature not exceeding 37° C.

6. The process comprising mixing a previously prepared polymeride of a liquid monomer containing a terminal $CH_2:C=$ group with 2-naphthalene-sulfinic acid, introducing into the resulting mixture a liquid monomer containing a terminal $CH_2:C=$ group until the mass assumes a pasty state, and molding and polymerizing said mass in the presence of said 2-naphthalene-sulfinic acid as the sole catalytic agent, the latter being present in the mass being polymerized in an amount between the limits of about 0.1% and about 5.0% taken on the weight of the said introduced liquid monomer.

7. The process as defined in claim 1 in which the polymerization is effected at a temperature not exceeding 37° C.

8. In a process for the bulk polymerization of a liquid monomer containing a terminal $CH_2:C=$ group, the step of reducing the period of induction where little polymerization occurs, comprising effecting the polymerization in the presence of a catalyst consisting solely of a sulfinic acid compound of the aromatic series in an amount between the limits of about 0.1% and about 5.0% taken on the weight of the liquid monomer.

PIERRE CASTAN.
OSKAR HAGGER.

REFERENCES CITED

The following references are of record in the file of this patent:

UNITED STATES PATENTS

| Number | Name | Date |
|---|---|---|
| 2,116,318 | Miles | May 3, 1938 |
| 2,234,993 | Vernon et al. | Mar. 18, 1941 |
| 2,419,090 | Rainard | Apr. 15, 1947 |
| 2,434,054 | Roedel | Jan. 6, 1948 |
| 2,436,926 | Jacobson | Mar. 2, 1948 |

OTHER REFERENCES

Schjanberg: Berichte Dent. Chem. Gesel. (B), volume 76, 1943, pp. 287, 291.